United States Patent [19]

Palmer

[11] 3,881,947
[45] May 6, 1975

[54] BONDED PARTICULATE MATERIAL

[75] Inventor: Graham Eastwood Palmer, Birmingham, England

[73] Assignee: Foseco International Limited, Birmingham, England

[22] Filed: Apr. 2, 1973

[21] Appl. No.: 346,791

[30] Foreign Application Priority Data
Apr. 4, 1972 United Kingdom............... 15443/72
Aug. 9, 1972 United Kingdom............... 37218/72

[52] U.S. Cl................................ 106/84; 106/38.35
[51] Int. Cl................................................ C04b 35/16
[58] Field of Search...................... 106/38.35, 74, 84

[56] References Cited
UNITED STATES PATENTS

| | | | |
|---|---|---|---|
| 2,662,022 | 12/1953 | Dietz | 106/84 |
| 3,138,471 | 6/1964 | Wygant | 106/84 |
| 3,149,985 | 9/1964 | Gandon | 106/74 |
| 3,661,602 | 5/1972 | Gerow | 106/84 |

*Primary Examiner*—J. Poer
*Attorney, Agent, or Firm*—Cushman, Darby & Cushman

[57] ABSTRACT

Particulate material is bonded to coherent form by mixing together a major proportion of the particulate material, aqueous alkali metal silicate and a minor proportion of a hardener comprising a liquid polyhydric alcohol capable of forming a stable solution with the alkali metal silicate and a fully esterified ester of a polyhydric alcohol.

7 Claims, No Drawings

BONDED PARTICULATE MATERIAL

This invention relates to bonded particulate material. The present invention is particularly applicable to the production of sand moulds and cores in the foundry industry, and it will be specifically described in connection with this field. However, it should be appreciated that the bonding systems disclosed are of value in producing bonded particulate materials in other fields, particularly in producing bonded particulate refractory materials for various uses.

A widely used binding agent for particulate refractory materials is aqueous sodium silicate. In order to produce the bonded material, the silicate is mixed with the particulate material and then caused to harden. In recent years, the hardening of these mixtures has been carried out by a wide variety of methods, one method of value being to use organic ester hardeners. Specifications Nos. 1,150,541 and 1,260,439 disclose various ester hardening systems.

The reproducibility of results of many ester hardening systems is difficult to obtain because of initial variability in the ester materials used. Generally speaking, ester mixtures containing partial esters are used, e.g. partial esters of ethylene glycol or glycerol. These materials, in the forms in which they are commercially available, invariably contain more than one partial ester, and may contain some wholly esterified material and even some unesterified material. These variations lead to great variation in performance and this is undesirable.

The use of fully esterified esters alone has not previously met with much success since the setting times of mixtures of sodium silicate and full esters are very long and this is commercially unacceptable. It is believed that this may be due at least in part to the insolubility of fully esterified esters in the aqueous silicates used.

According to the present invention there is provided a process for the production of a bonded particulate material, particularly of a bonded particulate refractory material, which comprises mixing together a major proportion of the particulate material, aqueous alkali metal silicate and a minor proportion of a hardener comprising a liquid polyhydric alcohol capable of forming a stable solution with the alkali metal silicate and a fully esterified ester of a polyhydric alcohol.

It is to be observed that both polyhydric alcohols and fully esterified polyhydric alcohols are available commercially to a high degree of purity, and accordingly the reproducibility of results using these materials is very high.

In carrying out the method of the present invention, the various components to form the bonded particulate material may be mixed together in any convenient fashion and shaped as necessary. Care must naturally be taken to ensure that shaping is complete before any substantial degree of hardening of the silicate by the hardener takes place. A particularly preferred method of procedure is to mix the particulate refractory, alkali metal silicate and optionally a proportion of polyhydric alcohol together to homogeneity, and thereafter to mix in a preformed solution of the fully esterified polyhydric alcohol and unesterified polyhydric alcohol. This gives favourable rapid hardening times and the development of sufficient compression strength to handle the bonded particulate material takes place quite rapidly.

As the polyhydric alcohol and the fully esterified ester of a polyhydric alcohol may not be completely miscible in all proportions at ambient temperature it may be desirable to incorporate into the hardener a mutual solvent for the polyhydric alcohol and the ester. The mutual solvent may itself be a polyhydric alcohol, for example, hexylene glycol, or it may be for example, iso-octyl alcohol or methylisobutyl carbinol. One or more mutual solvents may be used. The use of a mutual solvent enables hardeners having a higher polyhydric alcohol : ester ratio than would normally be possible to be formulated. When a mutual solvent is used it will normally be present in an amount up to about 15 percent by weight of the hardener composition.

As noted above the preferred alkali metal silicate bonding agent is sodium silicate, and this may be used in a wide range of $SiO_2:Na_2O$ ratios and solids contents. $SiO_2:Na_2O$ ratios of 2.2 – 3.5 : 1 and solids content of 35 – 55 percent by weight are preferably used. The application rate of sodium silicate solution to particulate material may vary widely with the particulate material used: for foundry sand moulding, a proportion of between 1 and 5 percent is preferred, most preferably 3 – 4 percent by weight.

Suitable liquid polyhydric alcohols include glycerol, ethylene glycol, diethylene glycol, triethylene glycol and other polyhydric alcohols which consist of hydrocarbon or hydrocarbon ether chains carrying two or more hydroxy groups. Condensation products of ethylene oxide may also be used.

Suitable esters include esters of the aforementioned polyhydric alcohols having ester groups derived from carboxylic acids. The ester group will normally be derived from lower fatty acids such as acetic, propionic and butyric acids.

The amount of hardener used may vary quite widely but is generally from 5 to 20 percent by weight of the weight of aqueous alkali metal silicate used. Thus in foundry moulding sands, a proportion of 0.1 – 0.8 percent by weight of the total sand moulding composition is a preferred hardener addition range. The relative weight ratio of polyhydric alcohol to fully esterified polydydric alcohol in the hardener mix is preferably from 1:12 to 1:1.

In addition to a polyhydric alcohol and a fully esterified ester of a polyhydric alcohol the hardener may contain a proportion of one or more partially esterified esters of a polyhydric alcohol, for example, glycerol diacetate or ethylene glycol monoacetate. The hardener may also contain more than one polyhydric alcohol and/or more than one fully esterified ester of a polyhydric alcohol.

It should be understood that the present invention includes not only the method of manufacturing bonded particulate materials set forth above, but also includes additives for use in the method. In particular the present invention includes two-pack additives, the first pack comprising aqueous alkali metal silicate or a mixture of aqueous metal silicate and a liquid polyhydric alcohol, and the second pack comprising of a mixture of a liquid polyhydric alcohol, and a fully esterified ester of a polyhydric alcohol, and optionally a mutual solvent for the polyhydric alcohol and the ester.

The following specific examples will serve to illustrate the invention:

EXAMPLE 1

A mixture was made up as follows (% by weight)

| | |
|---|---|
| Aqueous sodium silicate ($SiO_2:Na_2O$ ratio 2.50; 43.6% solids) | 3.5% |
| Ethylene glycol diacetate | 0.35% |
| Ethylene glycol | 0.030% |
| Erith sand (grain fineness 60) balance to | 100% |

This composition was mixed and allowed to set at 20°C. A bench life of 90 minutes was observed together with a final compression strength after 24 hours of 450 p.s.i.

EXAMPLE 2

Example 1 was repeated but using 0.143 percent of ethylene glycol in place of 0.030 percent ethylene glycol used in Example 1. The mixture had a bench life of 17 minutes at 20°C and the test pieces had a final compression strenth of 550 p.s.i. after 24 hours. 1½ hours after mixing the compression strength was 300 p.s.i., this being a particularly favourable compression strength development, allowing early stripping of the formed shapes in practice.

EXAMPLE 3

A foundry sand composition was made up as follows (% by weight).

| | |
|---|---|
| Aqueous sodium silicate ($SiO_2:Na_2O$ ratio 2.50:1: 43.6% solids) | 3.5% |
| Ethylene glycol diacetate | 0.40% |
| Ethylene glycol | 0.11% |
| Hexylene glycol | 0.046% |
| Erith sand (grain fineness 60) balance to | 100% |

The composition was mixed and allowed to set at 20°C. A bench life of 15 minutes was observed together with a final compression strength of 550 p.s.i. after 24 hours. 1½ hours after mixing the compression strength was 300 p.s.i.

EXAMPLE 4

A foundry sand composition was prepared using a two-pack additive. The first pack (A) consisted of aqueous sodium silicate having a $SiO_2:Na_2O$ ratio of 2.5:1 and a solids content of 43.6 percent by weight, and the second pack (B) consisted of a mixture containing 78 percent by weight ethylene glycol diacetate, 15.6 percent by weight ethylene glycol and 6.4 percent by weight hexylene glycol. The foundry sand had the following composition by weight:-

| | |
|---|---|
| Pack A | 3.50% |
| Pack B | 0.47% |

Erith sand (grain fineness 60) balance to 100%

The composition was allowed to set at 23.5°C. A bench life of 25 minutes was observed together with a final compression strength after 24 hours of 592 p.s.i.

I claim as my invention:

1. In a process for the production of bonded refractory particulate material which comprises mixing together a major proportion of the particulate material, a bonding quantity of aqueous alkali metal silicate and sufficient hardener to harden the alkali metal silicate, the improvement comprising using sodium silicate of $SiO_2 : Na_2O$ ratio 2.2 – 3.5 : 1 as the alkali metal silicate and using as the hardener a mixture consisting essentially of a liquid polyhydric alcohol capable of forming a stable solution with the alkali metal silicate and a fully esterified ester of a polyhydric alcohol.

2. A process according to claim 1 wherein the particulate refractory and alkali metal silicate are first mixed to homogeneity and thereafter a preformed solution of fully esterified polyhydric alcohol and unesterified polyhydric alcohol is mixed in.

3. A process according to claim 1 wherein at least one mutual solvent for the fully esterified polyhydric and the unesterified polyhydric alcohol is incorporated into the mixture.

4. A process according to claim 3 wherein the mutual solvent is selected from the class consisting of hexylene glycol, iso-octyl alcohol and methyl isobutyl carbinol.

5. A process according to claim 1 wherein the ingredients of the mixture are present in the following proportions by weight:

| | |
|---|---|
| alkali metal silicate | 1 – 5% |
| mixture of unesterified polyhydric alcohol and fully esterified polyhydric alcohol | 0.1 – 0.8% |
| particulate material | balance to 100%. |

6. A process according to claim 1 wherein the weight ratio of unesterified polyhydric alcohol to fully esterified polyhydric alcohol is 1 : 12 to 1 : 1.

7. A process according to claim 1 wherein at least one partially esterified ester of a polyhydric alcohol is incorporated in the mixture.

* * * * *